May 6, 1924.

M. LACHMAN ET AL 1,492,992

COMPOSITE METAL WORK AND METHOD OF MAKING SAME

Filed Feb. 18, 1922

INVENTORS
Maurice Lachman, Edward Fulda
and Laurence S. Lachman
BY Townsend & Decker
ATTORNEYS.

Patented May 6, 1924.

1,492,992

UNITED STATES PATENT OFFICE.

MAURICE LACHMAN, LAURENCE S. LACHMAN, AND EDWARD FULDA, OF NEW YORK, N. Y., ASSIGNORS TO UNIVERSAL ELECTRIC WELDING COMPANY, OF LONG ISLAND CITY, NEW YORK, A CORPORATION OF NEW YORK.

COMPOSITE METAL WORK AND METHOD OF MAKING SAME.

Application filed February 18, 1922. Serial No. 537,422.

*To all whom it may concern:*

Be it known that we, MAURICE LACHMAN, LAURENCE S. LACHMAN, and EDWARD FULDA, citizens of the United States, and residents of New York, in the county of New York and State of New York, have invented certain new and useful Improvements in Composite Metal Work and Methods of Making Same, of which the following is a specification.

My invention relates to electrically welded composite metal work and particularly to work of the kind in which the elements have flat and preferably engaged opposing surfaces that are fastened together by one or more electrical spot welds produced in said surfaces by the electrical resistance and pressure process.

While in some of its features my invention is applicable to metal work in which two plates only are employed, it is particularly applicable to and useful in the case of metal work comprising three or more plates or members and having an intermediate member with its flat, opposite surfaces engaged by the surfaces of two other plates and in which the three are fastened together to provide a composite structure by spot welds in the material of both surfaces of the intermediate plate and the surfaces of the two embracing plates opposed respectively thereto.

My invention relates furthermore to a particular class of composite metal work in which one plate or member has a flat surface from which projects a flange or plate comprising an angle bar or plate engaged by the surface of one of its angles directly with the surface of the flat member.

As my invention is particularly useful in the production of beams, girders and other structural elements but more particularly beams or girders of the plate type in which the web is made of a rolled plate and is provided at either or both edges with one or more flanges as in the I, T, channel or U or other structural shape wherein the flange projects practically at right angles from the plane of the web. It will be described herein as applied in connection with the production of composite metal work of that form although it is applicable to other forms and to other kinds of work of a composite character having opposed surfaces welded together at spots.

My present invention consists in the method of manufacturing composite metal work of the general character above described and also in the manner of manufacturing structural metal work such as flanged beams or girders or other work having a flange projecting from the surface thereof.

It has been before proposed to roll beams or girders of this form complete with their flanges but this requires a costly plant particularly for the larger sizes and to avoid expense it has therefore been proposed to roll webs or flats and angle bars separately and then rivet one leg or angle of the angle bar to the surface of the web or flat near its edge, the other angle then serving as the flange. In such construction it is of course necessary to perforate the web as well as the angle bar for the reception of the rivets so that the resultant beam or girder as a whole is necessarily weaker than the completely rolled beam, although the expense might be less in so far as a smaller mill and simpler rolls may be employed.

According to my invention the web or flat and angle bars are rolled separately thus permitting the use of a comparatively inexpensive mill and rolling operation and both the web and the angle or angles are imperforate but are joined to one another by integral welds in the material of engaged imperforate surfaces of the web and angle, the welds on the opposite surfaces of the web being aligned with one another, and the welds repeated as often as desired. In practice, owing to the fact that neither the web nor the angles are perforated, the necessary strength of the composite structure may be obtained in my improved beam or girder with a less number of unions while furthermore the liability to loosening and shearing of the rivets is entirely avoided. This is a very important feature of my invention particularly in the case of beams or girders carrying heavy fluctuating loads and subject to much vibration.

In carrying out my invention the welds or unions are formed by the electrical resistance and pressure method of welding with the result of a homogeneous joint or weld in the flat engaged surfaces without injury to the metal and with a practically indestructible union and a resultant product that for practical purposes is as strong as the completely rolled flanged beam or girder.

The particular method of welding the angle to the web which I prefer to employ will be more particularly described in connection with the accompanying drawings.

1 is the flat or web of the structure which may readily be rolled in a mill having plain or flat rolls.

Figure 1:
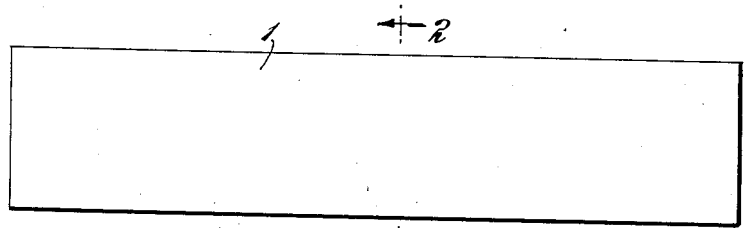
Fig. 1 is a side elevation of the separately rolled web or flat which forms a part of the beam or girder.
Figure 2:
Fig. 2 is a cross-section through the same at any point in its length.
Figure 3:
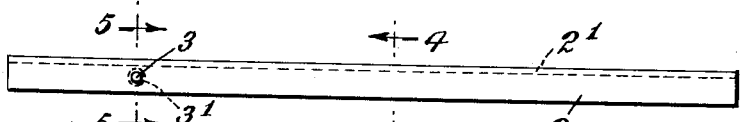
Fig. 3 is a side elevation of a rolled angle bar for use with the flat Fig. 1.
Figure 4:
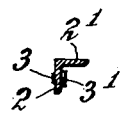
Fig. 4 is a cross-section of the angle bar on the line 4—4 Fig. 3.
Figure 5:
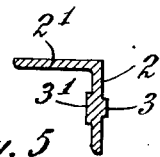
Fig. 5 is an enlarged cross-section on the line 5—5 Fig. 3 at the point where it is provided with buttons or projections on opposite faces of one of its angles to assist in the welding thereof to the flat.

In Figs. 3, 4 and 5 I show the separately roller angle bar of which the arm or angle 2' may be the arm or flange of the beam or girder while the angle or arm 2 is the arm to be welded on its face to the face of the web or flat. At any desired number of points the arm 2 is provided preferably with two projections or buttons 3, 3' located on its opposite faces respectively and in alignment. The projection 3 engages the face of the flat 1 in the welding operation and the other button 3' which is preferably somewhat larger than 3 is engaged by the electric welding die 4 or 4'. The projections 3, 3' both or one may be and preferably are formed in the rolling operation of making the angle bar but I do not limit myself to forming them at the time of rolling or by the operation of rolling.

Figure 6:
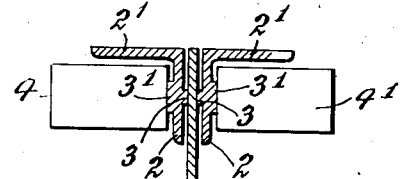
Fig. 6 shows in enlarged cross-section the flat and the two angle bars at opposite sides thereof respectively as assembled between welding dies or electrodes.
Figure 7:
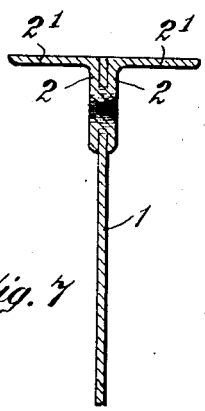
Fig. 7 is a cross-section through the completed union.

The web and the angle bars having been formed or provide as stated they are assembled as shown in Fig. 6 between the electric current supplying and pressure applying dies 4, 4' as shown in Fig. 6 with the buttons 3 in alignment. Said current supplying and pressure dies are preferably in the form of blocks having considerable working surface area and larger in that area than the area of the welded spot or the projection from the work utilized in localizing or concentrating the current and pressure. The parts having been assembled, heating electric current of large volume is passed from one die to the other simultaneously with the application of heavy pressure, thereby uniting the faces of the angles 2 to the opposite faces of the web or flat 1 in two integral homogeneous welds or unions in the imperforate material of the web or angles so that in effect there is a solid, unbroken mass of metal extending integrally through the angles and the web, the inner projections or buttons coalescing with or becoming merged in the structure of the web and angles in a practically homogeneous mass of metal.

In the operation the larger or outside button or projection 3' serves to receive the current and pressure of the welding die and transmit it effectively to the interior point of weld. This it is permitted to do because being of larger mass it will heat and soften more slowly than the interior small button 3. In practice the outer projection will become gradually bright red as the interior weld progresses. On continuance of the pressure and current the outer projection or button will flatten out and become merged in the outer surface of the angle arm so as to be flush therewith.

The buttons or projections 3 might be formed, swaged or forged on the opposite surfaces of the web or flat 1 but in line with one another and the inner projections 3 on the angle bar then dispensed with if desired. As in the case of the angle bars they may be formed on the web in the rolling operation.

The preparation of the intermediate plate for the welding of two other plates to opposite surfaces thereof respectively and by a single operation by providing said intermediate plate with a pair of welding projections on its opposite faces respectively in alignment with one another is not specifically claimed herein as it forms the subject of claims in our companion application filed of even date herewith, Serial No. 537,423.

Figure 8:
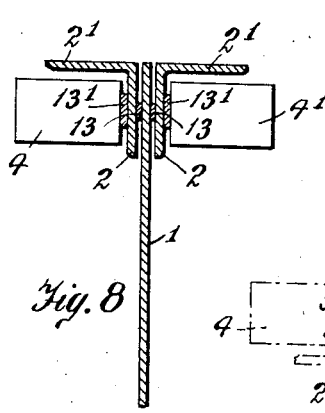
Fig. 8 shows the parts as assembled for union by the use of separately formed welding buttons or pieces.

In place of projections integral with the member 2 or 1 separate projections or welding pieces 13, 13' may be used as indicated in Fig. 8, the outer projection engaged by the die being preferably as before, larger than the inner one in order to concentrate the current and pressure effectively at the weld between the engaging faces of the members making up the beam, girder or other article.

The method herein described and utilized in the manufacture of flanged girders, columns or other steel construction may be used also in manufacturing composite or fabricated metal work of any description, and it is to be understood therefore that I do not limit myself to any special application of the same.

What I claim as my invention is:—

1. A flanged bar, beam or girder having a web consisting of a separately rolled imperforate flat and a separately rolled imperforate angle bar one arm of which is directly united by a flat surface engaged with a surface of the web by electric heat and pressure welds composed of portions of material of their opposed surfaces said portions being merged together or consolidated directly with one another in a homogeneous union.

2. An I beam or girder consisting of a rolled imperforate flat and rolled imperforate angle bars in direct engagement by their flat surfaces with and joined to the flat by integral consolidated or homogeneous welds in alignment with one another and comprising portions of material of opposite surfaces of the web and the opposed surfaces of pairs of angle bars on opposite sides of the web at its edges.

3. The process of manufacturing flanged beams or girders consisting in separately rolling flats and angle bars, assembling a flat and a pair of angle bars on opposite sides thereof between electric welding dies with imperforate arms of the angle bars separated from a face of the flat by welding projections in alignment with one another and welding the parts together in a homogeneous integral weld.

4. The method of welding two plates of metal together face to face consisting in assembling them between welding dies with a welding projection between the meeting surfaces and with a button or projection of larger mass in alignment therewith upon the outer face to receive the pressure and current of the welding die and then welding the plates together.

5. The method of manufacturing flanged bars, beams and girders consisting in rolling a flat and an angle bar separately with rolled welding projections of any desired number or location in a flat surface thereof, assembling them with said projections between their meeting surfaces and then welding them together by the electrical resistance and pressure method.

6. The method of manufacturing flanged bars, beams and girders consisting in rolling flats and angle bars separately, providing one of them in the rolling operation with pair of projections of any desired number and location on opposite surfaces respectively of one of them and in alignment with one another and then welding them together by the electrical resistance and pressure method.

7. The herein described method of manufacturing composite metal work comprising two members secured to opposite faces of an intermediate or third member, consisting in assembling said members between a pair of welding dies with welding projections in alignment with one another interposed between each face of the intermediate member and the exterior members and with a welding projection of slower heating capacity between the dies and the outer members and applying electric heating current and pressure by means of said dies.

8. A fabricated steel girder or column comprising a rolled imperforate web or flat and a pair of rolled imperforate angle bars joined to the flat by integral consolidated spot welds formed of material of the flat engaged imperforate surfaces of the angle bars and the two opposite surfaces of the web directly welded together, said points of weld on said opposite surfaces being aligned with one another.

9. The herein described method of spot welding two plates together by the application of current and pressure dies engaging the back surface of the work by surfaces greater than the area of the spot, consisting in providing one or more welding projections between the meeting surfaces and of area suited to the size of the spot and in alignment with said projection and on an outer surface thereof a projection of larger mass and area adapted to be engaged by the working surface of a die and subjecting the work to pressure and heating current by the operation of said dies.

10. The method of manufacturing composite metal work embracing a plate and a flange projecting from the surface thereof, consisting in separately forming the plate and an angle plate, providing one of them with pairs of integral projections of any desired number and location on opposite surfaces respectively thereof and in alignment with one another and then welding them together by the electrical resistance and pressure method applied through welding dies embracing them over the projections.

Signed at New York in the county of New York and State of New York this 15th day of February A. D. 1922.

MAURICE LACHMAN.
LAURENCE S. LACHMAN.
EDWARD FULDA.

Witnesses:
F. B. TOWNSEND,
GEORGE E. BROWN.